(12) United States Patent
Fujisawa et al.

(10) Patent No.: US 7,001,027 B2
(45) Date of Patent: Feb. 21, 2006

(54) LIGHT SOURCE DEVICE AND PROJECTOR

(75) Inventors: Shohei Fujisawa, Matsumoto (JP); Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 87 days.

(21) Appl. No.: 10/806,141

(22) Filed: Mar. 23, 2004

(65) Prior Publication Data

US 2004/0246451 A1  Dec. 9, 2004

(30) Foreign Application Priority Data

Mar. 25, 2003  (JP) ............................. 2003-082921
Sep. 19, 2003  (JP) ............................. 2003-327238

(51) Int. Cl.
G03B 21/28  (2006.01)
G03B 21/14  (2006.01)
G03B 21/26  (2006.01)
F21V 7/00   (2006.01)
H01J 5/16   (2006.01)

(52) U.S. Cl. ............................. 353/98; 353/30; 353/82; 362/297; 313/113; 313/318.11

(58) Field of Classification Search ............ 353/97–98, 353/30, 34, 82; 359/850; 362/296–297; 313/113, 318.11
See application file for complete search history.

(56) References Cited

U.S. PATENT DOCUMENTS

2004/0032739 A1 * 2/2004 Johanson ................... 362/304

FOREIGN PATENT DOCUMENTS

| JP | U 01-75233   | 5/1989  |
|----|--------------|---------|
| JP | A 05-088258  | 4/1993  |
| JP | A 06-075222  | 3/1994  |
| JP | A 6-203806   | 7/1994  |
| JP | A 06-289394  | 10/1994 |
| JP | A 08-273401  | 10/1996 |
| JP | 9-120067     | 5/1997  |
| JP | A 09-259817  | 10/1997 |
| JP | A 11-143378  | 5/1999  |
| JP | A 2001-176303| 6/2001  |
| JP | A 2002-62586 | 2/2002  |

* cited by examiner

*Primary Examiner*—Judy Nguyen
*Assistant Examiner*—Magda Cruz
(74) *Attorney, Agent, or Firm*—Oliff & Berridge, PLC

(57) ABSTRACT

A light source device includes: a light-emitting tube including a light-emitting portion; a reflector including a neck portion provided with an insertion hole to which the light-emitting tube is inserted, and a reflecting portion integrally formed with the neck portion and having an ellipsoidal curved reflecting surface. The light-emitting tube has a sub-reflection mirror that covers substantially front half of the light-emitting portion. The reflector has a step formed between the peripheral edge of an opening end of the insertion hole near the reflecting surface. The external diameter of the step is larger than the external diameter of the sub-reflection mirror while the external diameter of the step is within the internal diameter of a valid reflection area of the reflector, the internal diameter being defined by a focal position on the front side of the reflector and the outer periphery of the sub-reflection mirror.

4 Claims, 14 Drawing Sheets

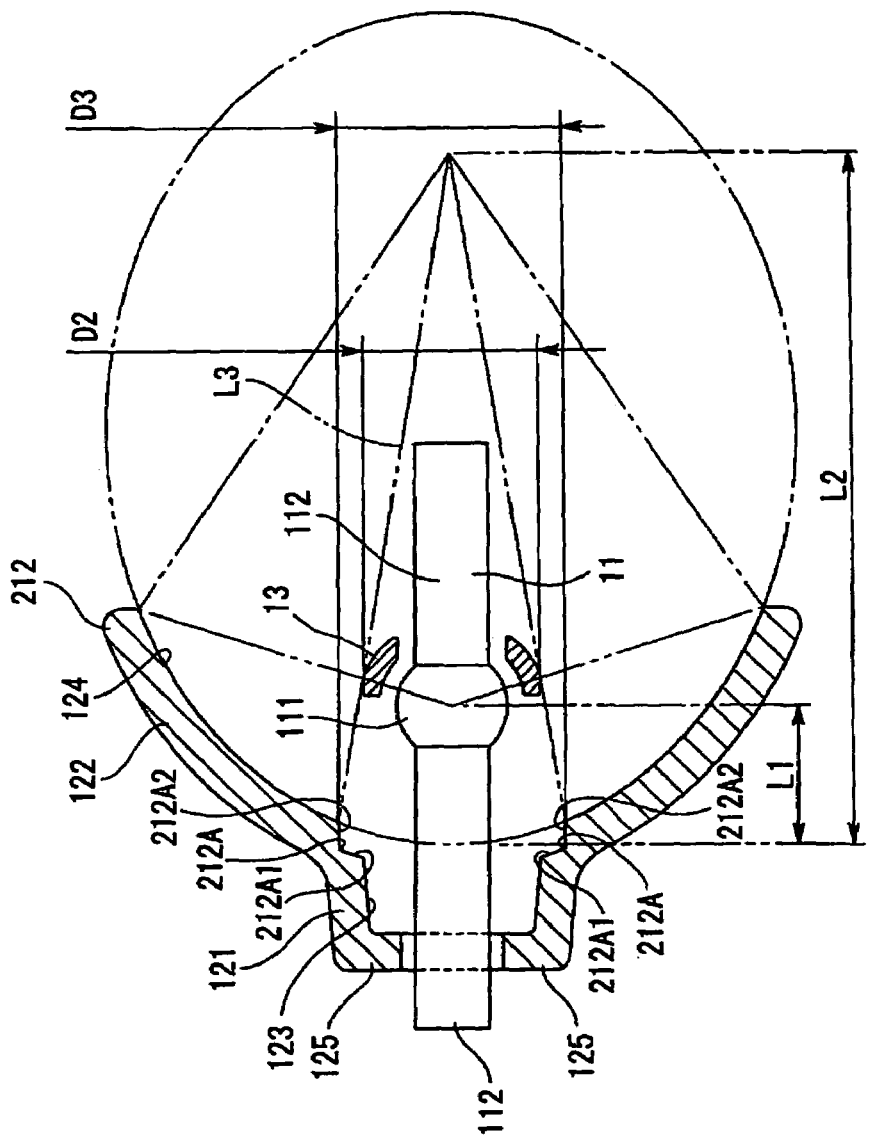

LIGHT SOURCE DEVICE AND PROJECTOR

BACKGROUND OF THE INVENTION

1. Field of the Invention

The present invention relates to a light source device that has: a light-emitting tube including a light-emitting portion that generates a light beam by an electric discharge between electrodes, and sealing portions provided on both sides of the light-emitting portion; and a reflector including a neck portion provided with an insertion hole to which the light-emitting tube is inserted, and a reflecting portion integrally formed with the neck portion and having an ellipsoidal curved reflecting surface that irradiates the light beam emitted by the light-emitting portion forward after and aligns the light beam in a predetermined direction, as well as to a projector including the light source device.

2. Description of Related Art

Conventionally, projectors that modulate a light beam irradiated by a light source in accordance with image information to project an optical image in an enlarged manner have been used for the purpose of presentation at conferences etc in conjunction with personal computers. Besides, such projectors are recently used for the purpose of home-theater for serving the needs of watching movies etc. on a wide screen at home.

The known light source device used for the projector is that houses an electric discharge light-emitting tube such as a metal halide lamp or high-pressure mercury lamp and a reflector in a lamp housing etc. by integrating each other.

The light-emitting tube, or a high-pressure mercury lamp for instance, has a light-emitting portion in which a pair of tungsten electrodes spaced apart by a predetermined distance, mercury, rare gas and a small amount of halogen are sealed, and sealing portions provided on both sides of the light-emitting portion with molybdenum foils electrically connected to the electrodes inserted and sealed by glass material etc.

The reflector has a neck portion with an insertion hole to which the light-emitting tube is inserted, and a reflecting portion integrally formed with the neck portion and having an ellipsoidal curved reflecting surface that irradiates the light beam emitted by the light-emitting portion and aligns the light beam in a predetermined direction.

When the light-emitting tube and the reflector are integrated, the sealing portion of the light-emitting tube is inserted to the insertion hole of the reflector, positioned so that the light-emitting portion is positioned at a predetermined position inside the reflector, and consequently the light-emitting tube can be fixed inside the reflector by curing a silica-alumina inorganic adhesive after filling it from the base end side of the insertion hole to the part between the insertion hole and the sealing portion.

Note that, it would be difficult to fill the inorganic adhesive if the gap between the insertion hole and the sealing portion is too small whereas the inorganic adhesive would overflow from the gap to the reflecting surface of the reflector if the gap is too large.

Therefore, such configuration is conventionally suggested that a narrow part is formed on the insertion hole of the reflector at a part adjacent to the reflecting surface, so that the inorganic adhesive does not overflow to the reflecting surface (see JP2002-62586A, JP6-203806A).

However, in the above prior arts according to the references, deposition processing on the reflecting surface is conducted from the side of the reflecting portion of the reflector when the reflecting surface of the reflector being deposited, and consequently, the material for forming the reflecting surface is also formed on the edge of the opening of the insertion hole. Accordingly, when injecting and filling the adhesive, the adhesive may adhere on the reflection film formed on the edge of the opening of the insertion hole, thus corroding the reflecting surface.

An object of the present invention is to provide a light source device that inhibits the corrosion on a reflecting surface of the reflector due to an inorganic adhesive used for fixing a light-emitting tube on the reflector, as well as a projector.

SUMMARY OF THE INVENTION

A light source device according to an aspect of the present invention includes: a light-emitting tube including a light-emitting portion that generates a light beam by an electric discharge between electrodes, and sealing portions provided on both sides of the light-emitting portion; and a reflector including a neck portion provided with an insertion hole to which the light-emitting tube is inserted, and a reflecting portion integrally formed with the neck portion and having an ellipsoidal curved reflecting surface that irradiates the light beam emitted by the light-emitting portion and aligns the light beam in a predetermined direction, in which the light-emitting tube has a sub-reflection mirror that covers substantially front half of the light-emitting portion, in which the reflector has a step formed between the peripheral edge of an opening end of the insertion hole near the reflecting surface and the reflecting surface, in which the external diameter of the step is larger than the external diameter of the sub-reflection mirror while the external diameter of the step is within the internal diameter of a valid reflection area of the reflector, the internal diameter being defined by a focal position on the front side of the reflector and the outer periphery of the sub-reflection mirror, and in which the step has a part where the reflecting surface is not deposited on the border with the valid reflection area.

Preferably, in the above configuration, the step may be formed as a recess by cutting the part between the reflecting surface and the inner periphery of the insertion hole to have an L-shaped cross-section, and a lateral side of the step adjacent to the reflecting surface may be the part where the reflecting surface is not deposited.

With this arrangement, since the step having the part where the reflecting surface is not deposited separates the deposition part of the reflecting surface and the insertion hole, when the adhesive is injected to the insertion hole, the adhesive can be prevented from contacting to the deposition part of the reflecting surface, thus preventing the reflecting surface from being damaged.

Additionally, since the lateral side of the step substantially in parallel to the inner surface of the insertion hole is adjacent to the reflecting surface, when assuming that the deposition processing direction of the reflecting surface is considered as the optical axis direction of the ellipsoidal reflector, the lateral side of the step becomes a surface substantially parallel to the deposition processing direction. Accordingly, the lateral side of the step can be prevented from being deposited at the deposition processing of the reflecting surface, thus further preventing the reflecting surface from being damaged by separating the adhesive to be filled to the insertion hole and the reflecting surface.

A projector according to another aspect of the present invention includes: a light source device; an optical modulator that modulates a light beam irradiated by the light source device in accordance with image information to form an optical image; and a projection optical device that projects the optical image formed by the optical modulator in an enlarged manner, in which the light source device includes: a light-emitting tube including a light-emitting portion that generates a light beam by an electric discharge between electrodes, and sealing portions provided on both sides of the light-emitting portion; and a reflector including a neck portion provided with an insertion hole to which the light-emitting tube is inserted, and a reflecting portion integrally formed with the neck portion and having an ellipsoidal curved reflecting surface that irradiates the light beam emitted by the light-emitting portion and aligns the light beam in a predetermined direction, in which the light-emitting tube has a sub-reflection mirror that covers substantially front half of the light-emitting portion, in which the reflector has a step formed between the peripheral edge of an opening end of the insertion hole near the reflecting surface and the reflecting surface, in which the external diameter of the step is larger than the external diameter of the sub-reflection mirror while the external diameter of the step is within the internal diameter of a valid reflection area of the reflector, the internal diameter being defined by a focal position on the front side of the reflector and the outer periphery of the sub-reflection mirror, and in which the step has a part where the reflecting surface is not deposited on the border with the valid reflection area.

With this arrangement, since not only the reflecting surface of the reflecting portion of the reflector would not be damaged, but also the amount of the irradiated light beam would not be reduced, the projector may provide a bright and high-resolution projection image.

BRIEF DESCRIPTION OF THE DRAWINGS

FIG. 5 is a cross sectional view showing the structure of an ellipsoidal reflector of the aforesaid embodiment;

DETAILED DESCRIPTION OF PREFERRED EMBODIMENT(S)

Figure 1:
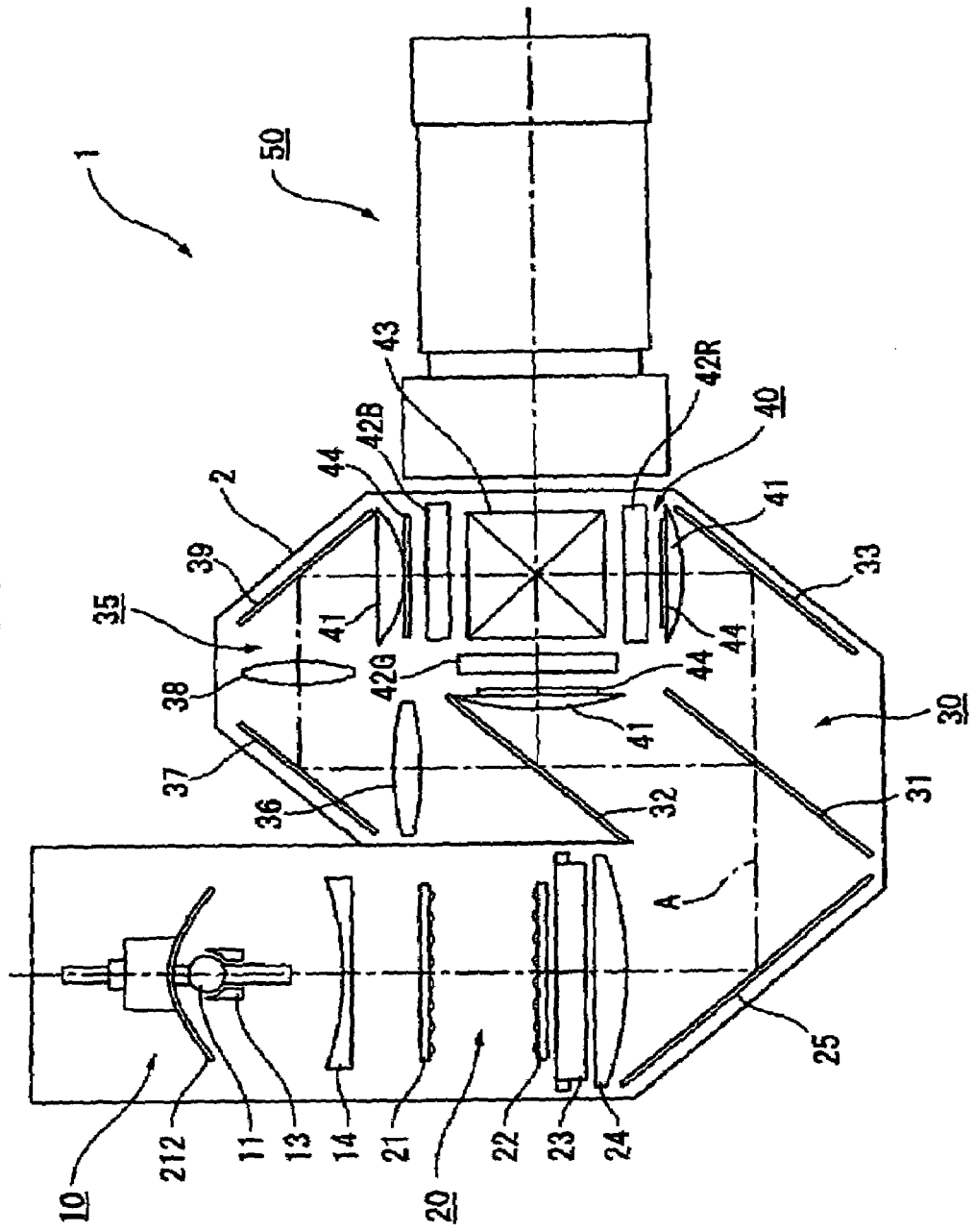
FIG. 1 is a schematic illustration showing the structure of an optical system of a projector according to a first embodiment of the present invention.

FIG. 1 is a schematic illustration showing an optical system of a projector 1 according to an embodiment of the present invention. The projector 1 is an optical equipment that modulates a light beam irradiated by a light source in accordance with image information to form an optical image, and projects the optical image on a screen in an enlarged manner, the projector 1 including a light source lamp unit 10 (light source device), an integrator illuminating optical system 20, a color-separating optical system 30, a relay optical system 35, an optical device 40 and a projection optical system 50. The optical elements of the optical systems 20, 30 and 35 are positioned and housed in a light guide 2 in which a predetermined illumination optical axis A is set.

The light source lamp unit 10 that irradiates a light beam emitted by a light source lamp 11 forward and aligns the light beam in a predetermined direction to illuminate the optical device 40, though described below in detail, includes the light source lamp 11, an ellipsoidal reflector 212, a sub-reflection mirror 13 and a parallelizing concave lens 14.

The light beam emitted by the light source lamp 11 is irradiated toward the front side of the device as a convergent light so that the irradiation direction thereof being aligned by the ellipsoidal reflector 212, the convergent light being parallelized by the parallelizing concave lens 14, and irradiated to the integrator illuminating optical system 20.

The integrator illuminating optical system 20 that splits the light beam irradiated by the light source lamp unit 10 into a plurality of sub-beams to integrate the in-plane luminance of an illumination area, includes a first lens array 21, a second lens array 22, a PBS array 23, a superposition lens 24 and a reflection mirror 25.

The first lens array 21 is a light-beam splitting optical element for splitting the light beam irradiated by the light source lamp 11 into a plurality of sub-beams, which includes a plurality of small lenses arranged in a matrix in a plane orthogonal to the illumination optical axis A, the profile of the respective small lenses being substantially similar to the shape of each image formation area of liquid crystal panels 42R, 42G and 42B of the optical device 40 (described below).

The second lens array 22 is an optical element for condensing the plurality of sub-beams split by the first lens array 21 and also includes a plurality of small lenses arranged in a matrix in a plane orthogonal to the illumination optical axis A in the same manner as the first lens array 21. However, since the second lens array 22 is dedicated to condense the sub-beams, it is not necessary that the profile of the respective small lenses thereof corresponds to the profile of the image formation area of the liquid crystal panels 42R, 42G and 42B.

The PBS array 23 is a polarization-converting element for aligning the polarization direction of the respective sub-beams split by the first lens array 21 into a uniform linear polarization light.

Though not illustrated, the PBS array 23 has an alternating arrangement of polarization separating films and reflection mirrors inclined relative to the illumination optical axis A. The polarization separating film transmits one of P polarized light beam and S polarized light beam contained in the respective sub-beams and reflects the other polarized light beam. The reflected other polarized light beam is bent by the reflection mirror and is irradiated in the irradiation direction of the transmitted one polarized light beam, i.e. along the illumination optical axis A. Either one of the irradiated polarized light beams is polarization-converted by a phase plate provided on the light-irradiation surface of the PBS array 23 so that the polarization direction of all of the polarized light beams are aligned. With the use of the PBS array 23, the light beam irradiated by the light source lamp 11 can be aligned in a uniform polarized light beam, thereby enhancing the utilization ratio of the light source beam used in the optical device 40.

The superposition lens 24 is an optical element for condensing the plurality of sub-beams having passed through the first lens array 21, the second lens array 22 and the PBS array 23 to superpose the sub-beams on the image formation areas of the liquid crystal panels 42R, 42G and 42B. The superposition lens 24 is an aspherical lens having a flat surface on the incident side of the light-transmission area and also having a hyperboloid surface on the irradiation side in the present embodiment, but may alternatively be a spherical lens.

The light beam irradiated by the superposition lens 24 is bent by the reflection mirror 25 to be irradiated to the color-separating optical system 30.

The color-separating optical system 30, which has two dichroic mirrors 31 and 32, and a reflection mirror 33, separates the plurality of sub-beams irradiated by the integrator illuminating optical system 20 by the dichroic mirrors 31 and 32 into three-color lights of red (R), green (G) and blue (B).

The dichroic mirrors 31 and 32 are optical elements having a base on which a wavelength-selection film that reflects a light beam of a predetermined wavelength and transmits a light beam of the other wavelength is formed, in which the dichroic mirror 31 disposed on the upstream of the optical path is a mirror that transmits the red light and reflects the other color lights. The dichroic mirror 32 disposed on the downstream of the optical path is a mirror that reflects the green light and transmits the blue light.

The relay optical system 35 has an incident-side lens 36, a relay lens 38, and reflection mirrors 37 and 39 to guide the blue light transmitted through the dichroic mirror 32 of the color-separating optical system 30 to the optical device 40. Incidentally, the relay optical system 35 is used for the optical path of the blue light in order to avoid deterioration in the light utilization efficiency on account of light dispersion and the like caused by the longer length of the optical path of the blue light than the optical path of other color lights. Though such arrangement is used in the present embodiment because of the longer optical path of the blue light, the optical path of the red light may alternatively be lengthened.

The red light separated by the above-described dichroic mirror 31 is bent by the reflection mirror 33 and, subsequently, fed to the optical device 40 through a field lens 41. The green light separated by the dichroic mirror 32 is directly fed to the optical device 40 through the field lens 41. The blue light is condensed and bent by the lenses 36, 38 and the reflection mirrors 37, 39 of the relay optical system 35 to be fed to the optical device 40 through the field lens 41. Incidentally, the field lenses 41 provided on the upstream of the optical path of the respective color lights of the optical device 40 are provided for converting the respective sub-beams irradiated by the second lens array 22 into light beams parallel to the illumination optical axis.

The optical device 40 modulates the light beam incident thereon in accordance with image information to form a color image, the optical device 40 including the liquid crystal panels 42R, 42G and 42B as an optical modulator to be illuminated and a cross dichroic prism 43 (color-combining optical system). Incidentally, incident-side polarization plates 44 are interposed between the field lens 41 and the respective liquid crystal panels 42R, 42G and 42B and, though not illustrated, irradiation-side polarization plates are interposed between the respective liquid crystal panels 42R, 42G and 42B and the cross dichroic prism 43. The incident-side polarization plates 44, the liquid crystal panels 42R, 42G and 42B and the irradiation-side polarization plates modulate the respective incident color lights.

The liquid crystal panels 42R, 42G and 42B are constructed by sealing liquid crystal (electrooptic material) between a pair of transparent glass substrates, which modulates the polarization direction of the polarized light beam irradiated by the incident-side polarization plate 44 in accordance with given image signal using, for instance, polycrystalline silicon TFT as a switching element. The image formation areas of the liquid crystal panels 42R, 42G and 42B have rectangular profile having diagonal dimension of, for instance, 0.7 inch.

The cross dichroic prism 43 is an optical element for combining the optical image modulated for each color light and irradiated by the irradiation-side polarization plate to form a color image. The cross dichroic prism 43 has a substantially planarly-viewed square profile by attaching four right-angle prisms, and dielectric multi-layer films are formed on the boundaries adhering on the respective right-angle prisms. One of the multi-layer films arranged in a substantially X-shape reflects the red light and the other multi-layer film reflects the blue light, the multi-layer films bending the red light and the blue light to be aligned with the advancing direction of the green light, thereby combining the three color lights.

The color image irradiated by the cross dichroic prism 43 is projected by the projection optical system 50 in an enlarged manner to form a large-size image on a screen (not shown).

The above-described light source lamp unit 10 (light source device) is capable of being attached to and detached from the light guide 2, so that the light source lamp unit 10 can be replaced when the light source lamp 11 is exploded or luminance of the lamp is deteriorated on account of life span thereof.

Figure 2:
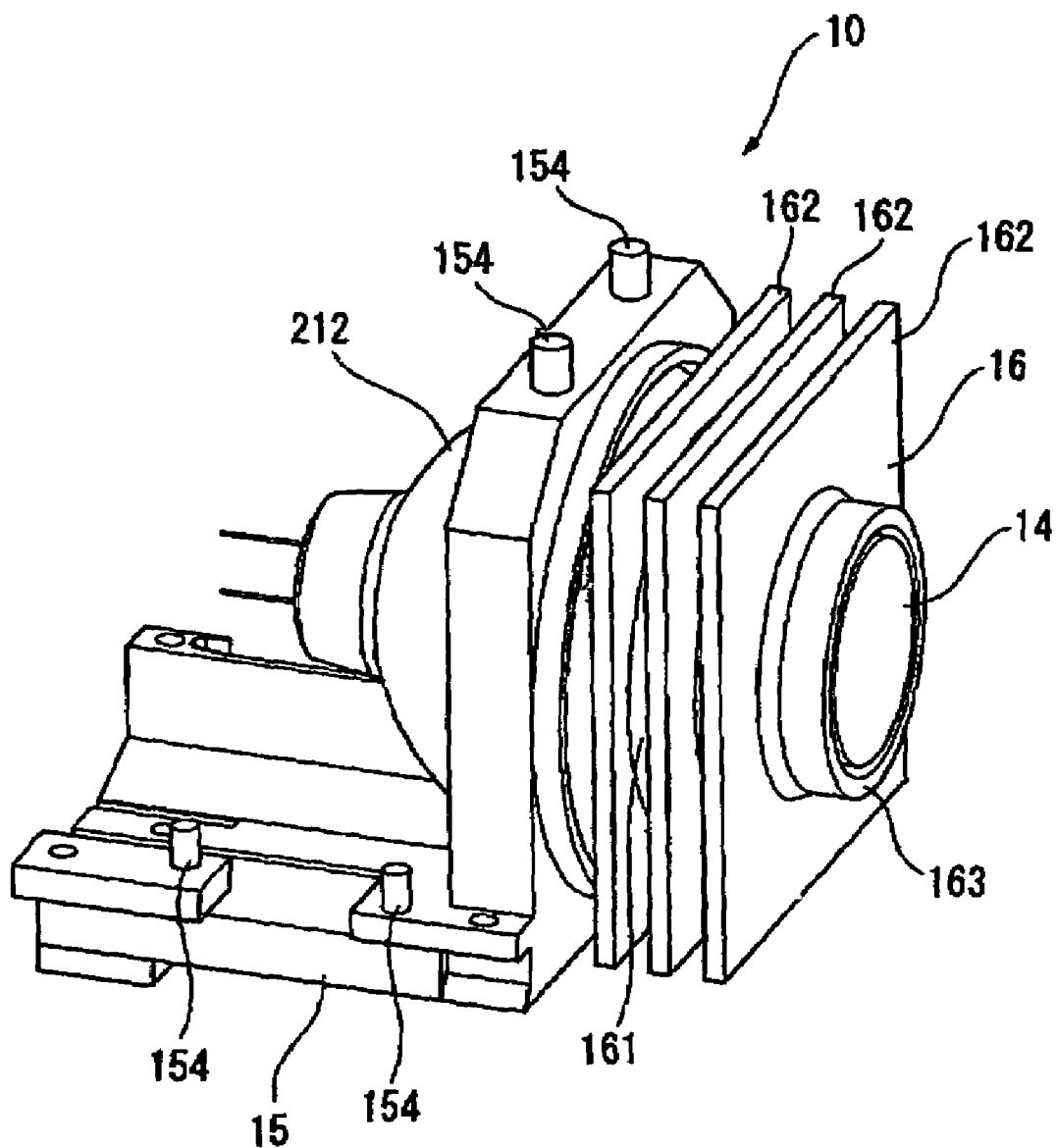
FIG. 2 is a perspective view showing an outline of the structure of a light source device of the aforesaid embodiment.
Figure 3:
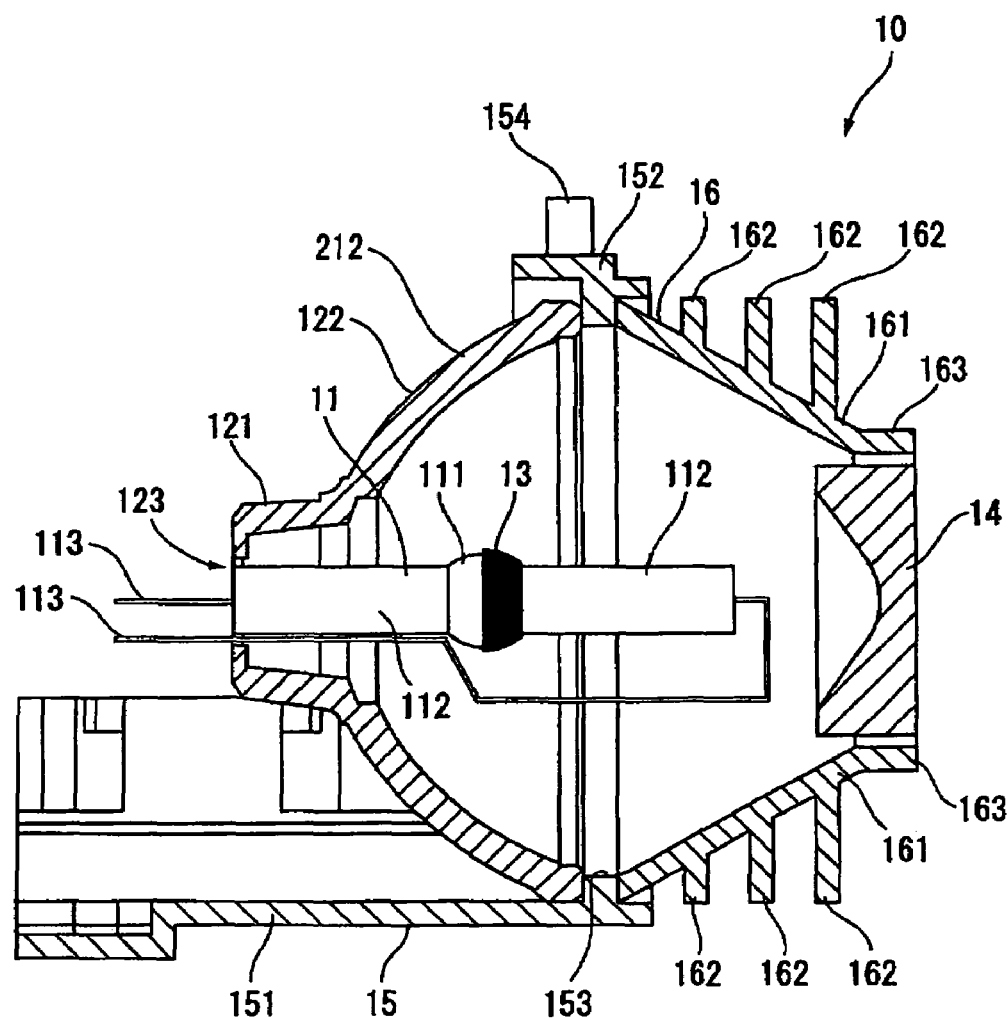
FIG. 3 is a cross sectional view showing the structure of the light source device of the aforesaid embodiment.

Specifically, the light source lamp unit 10 includes a lamp housing 15 and a cover 16 as well as the above-described light source lamp 11, the ellipsoidal reflector 212, the sub-reflection mirror 13 and the parallelizing concave lens 14, as shown in FIGS. 2 and 3.

The light source lamp 11 as a light-emitting tube is constructed by a silica glass tube with the central portion thereof being spherically bulged, the central portion being a light-emitting portion 111 and the portions extending on both sides of the light-emitting portion 111 being sealing portions 112.

Though not illustrated in FIG. 3, a pair of tungsten electrodes spaced apart by a predetermined distance, mercury, rare gas and a small amount of halogen are sealed inside the light-emitting portion 111.

Molybdenum foils electrically connected with the electrodes of the light-emitting portion 111 are inserted in the sealing portions 112 and sealed by glass material etc. Lead wires 113 (electrode-connecting wires) are connected to the molybdenum foils, the lead wires 113 extending toward the outside of the light source lamp 11.

When a predetermined voltage is applied to the lead wires 113, electric discharge is generated between the electrodes so that the light-emitting portion 111 emits light. Though not shown in FIG. 3, a nichrome wire or the like may be winded around the sealing portion 112 on the front side of the light source lamp 11 to preheat the light-emitting portion 111 by applying the current to the nichrome wire when the projector 1 is activated. If such a device for preheating is provided, the light source lamp 11 could be lit more quickly since the halogen cycle is started to work inside the light-emitting portion 111 earlier.

The ellipsoidal reflector 212, which is described below in detail, is a glass integral molding having a neck portion 121 to which the sealing portion 112 of the light source lamp 11 is inserted and a reflecting portion 122 of ellipsoidal curved surface extending from the neck portion 121.

An insertion hole 123 is formed at the center of the neck portion 121, and the sealing portion 112 is disposed at the center of the insertion hole 123.

The reflecting portion 122 is constructed by depositing a metal thin film on the ellipsoidal curved glass surface. The reflecting surface of the reflecting portion 122 is a cold mirror reflecting visible light and transmitting infrared radiation.

Figure 4:
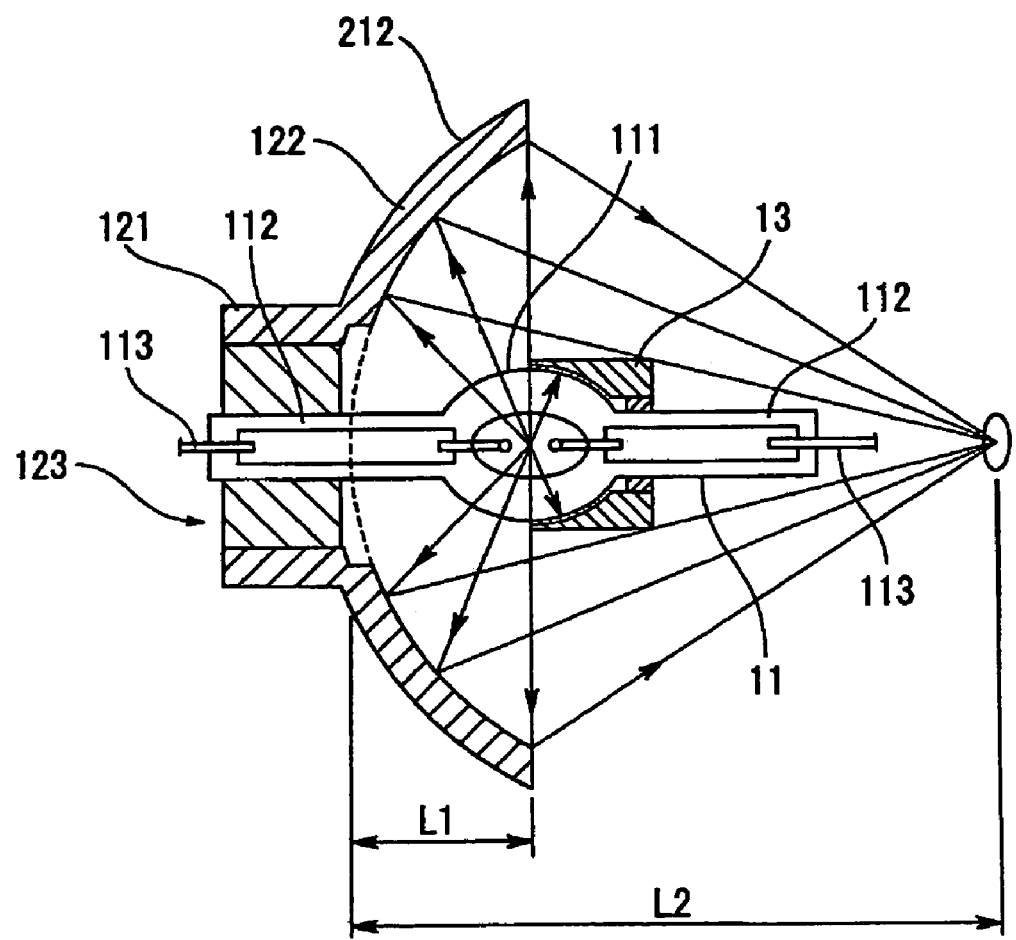
FIG. 4 is a schematic illustration showing how the light beam is emitted by the light source device of the aforesaid embodiment.

As shown in FIG. 4, the light source lamp 11 is disposed inside the reflecting portion 122 so that the light-emitting center between the electrodes inside the light-emitting portion 111 is positioned at a first focal position L1 of the ellipsoidal curved surface of the reflecting portion 122.

When the light source lamp 11 is lit, the light beam emitted by the light-emitting portion 111 is reflected by the reflecting surface of the reflecting portion 122 to be a convergent light converging at a second focal position L2 of the ellipsoidal curved surface of the reflecting portion 122.

The length of the ellipsoidal reflector 212 in the optical axis direction is smaller than that of the light source lamp 11. When the light source lamp 11 is attached to the ellipsoidal reflector 212, the sealing portion 112 on the front side of the light source lamp 11 is projected from a light-irradiation opening of the ellipsoidal reflector 212.

The sub-reflection mirror 13 is a reflecting component covering substantially front half of the light-emitting portion 111 of the light source lamp 11 when assuming that the light-irradiation direction of the reflector 212 is the forward. The reflecting surface is a concave curved surface corresponding to the spherical surface of the light-emitting portion 111 and, though not shown, the reflecting surface thereof is arranged as a cold mirror in the same manner as the ellipsoidal reflector 212.

By attaching the sub-reflection mirror 13 to the light-emitting portion 111, the light beam irradiated to the front side of the light-emitting portion 111 is reflected toward the ellipsoidal reflector 212 by the sub-reflection mirror 13 to be irradiated from the reflecting portion 122 of the ellipsoidal reflector 212 as shown in FIG. 4.

With the use of the sub-reflection mirror 13, since the light beam irradiated to the front side of the light-emitting portion 111 is reflected to the rear side, the irradiation direction of the light beam irradiated by the light-emitting portion 111 can be aligned even when the area of the ellipsoidal curved surface of the reflecting portion 122 is small, so that the dimension of the ellipsoidal reflector 212 in the optical axis direction can be reduced.

As shown in FIG. 3, the lamp housing 15 is an integral synthetic resin molding with an L-shaped cross section, which has a horizontal section 151 and a vertical section 152.

The horizontal section 151 is engaged with the wall of the light guide 2 to prevent light leakage by hiding the light source lamp unit 10 in the light guide 2. Further, though not illustrated, a terminal block for electrically connecting the light source lamp 11 with an external power source is provided on the horizontal section 151, the terminal block being connected with the lead wires 113 of the light source lamp 11.

The vertical section 152 is for determining the position of the ellipsoidal reflector 212 in the optical axis direction, to which a distal end of the ellipsoidal reflector 212 near the light-irradiation opening is fixed by an adhesive etc. in the present embodiment. An opening 153 for transmitting the light beam irradiated by the ellipsoidal reflector 212 is formed on the vertical section 152.

A projection 154 is formed on the horizontal section 151 and the vertical section 152. The projection 154 is engaged with a recess formed in the light guide 2 so that the light-emitting center of the light source lamp 11 is disposed on the illumination optical axis A of the light guide 2.

The cover 16 is an integral metal molding including a heat-absorber 161 of substantially conic cylinder attached to the opening 153 of the vertical section 152 of the lamp housing 15, a plurality of heat-radiation fins 162 projecting on the outside of the heat absorber 161, and a lens attachment 163 formed on the distal end of the heat absorber 161.

The heat absorber 161 absorbs radiation heat radiated by the light source lamp 11 and the heat of air convecting in the sealed space in the ellipsoidal reflector 212 and the cover 16, the inner surface of the heat absorber 161 being coated with anodized black-aluminum. The substantially conic slanted surface of the heat absorber 161 is parallel to the inclination of the light converged by the ellipsoidal reflector 212 to minimize the light beam irradiated by the ellipsoidal reflector 212 to be irradiated on the inner surface of the heat absorber 161.

The plurality of heat-radiation fins 162 are plate members extending orthogonal to the optical axis of the light source lamp unit 10 and gaps capable of sufficiently passing the cooling air is formed between the respective heat-radiation fins 162.

The lens attachment 163 is constructed by a cylindrical body projecting on the distal end of the heat absorber 161, to which the parallelizing concave lens 14 for parallelizing the convergent light of the ellipsoidal reflector 212 is attached. Incidentally, though not illustrated, the parallelizing concave lens 14 is fixed to the lens attachment 163 by an adhesive etc. When the parallelizing concave lens 14 is attached to the lens attachment 163, the space inside the light source lamp unit 10 is completely sealed so that the broken pieces of the light source lamp 11 do not scatter to the outside even when the light source lamp 11 is exploded.

Describing about the profile of the above ellipsoidal reflector 212 more in detail, the insertion hole 123 of the ellipsoidal reflector 212 is constructed in a cone with the diameter of the insertion hole 123 increasing from the base end side toward the reflecting surface 124. Besides, as shown in FIG. 5, a step 212A is formed between the opening of the insertion hole 123 on the side of a reflecting surface 124 and the reflecting surface 124.

A reflection film material of the reflecting surface 124 is neither formed on a bottom side 212A1 nor on a lateral side 212A2 of the step 212A.

The external diameter of the step 212A can be set between D2 and D3, when D2 is defined by the external diameter of the sub-reflection mirror 13, and D3 is defined by the internal diameter of a valid reflection area, or a part of the reflecting surface 124 irradiating the light beam not to be shielded by the outer periphery of the sub-reflection mirror 13. Incidentally, the external dimension of the step 212A is preferably to be closer to the dimension of D3 in view of protecting the reflecting surface 124.

The internal diameter D3 of the valid reflection area is the diameter of a circle defined by a nodal line between a cone, which is formed by a light beam L3, i.e., the boundary of the light beam shielded by the sub-reflection mirror 13 out of the light beam reflected by the reflecting surface 124 of the ellipsoidal reflector 212 and that condensed to the second focal position L2; and the reflecting surface 124 of the ellipsoidal reflector 212. The region within the cone formed by the light beam L3 is a part where the light beam emitted by the light-emitting portion 111 is shielded by the sub-reflection mirror 13. Thus, the light beam having reached to the region of the reflecting surface 124 within the cone cannot reach the second focal position L2 even when reflected by the reflecting surface 124. Therefore, the reflecting surface 124 of the ellipsoidal reflector 212 is not required to be formed on the region within the circle defined by the internal diameter D3 of the valid reflection area, but the external dimension of the step 212A may be extended to be equal to the internal diameter D3 of the valid reflection area.

Figure 6A:
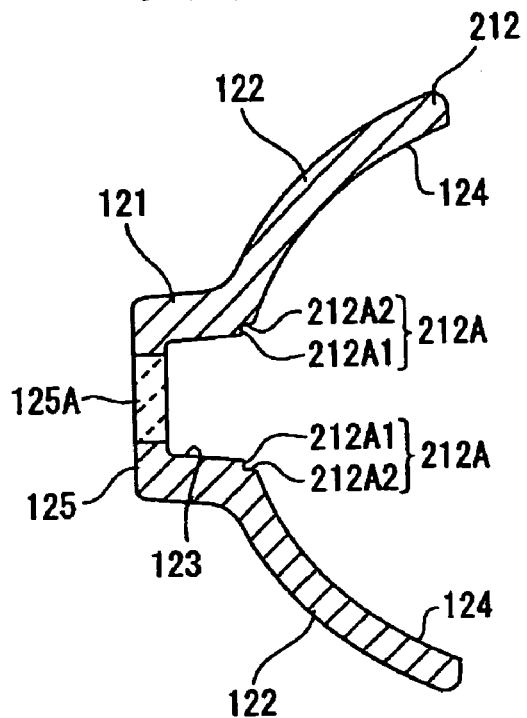
FIG. 6 is a cross sectional view showing the structure of the ellipsoidal reflector of the aforesaid embodiment.

On the base end of the insertion hole 123, a ring-shaped narrowest portion 125 is projected on the inner surface of the insertion hole 123 as shown in FIG. 6A.

The narrowest portion 125 is integrally formed with the neck portion 121, the narrowest portion 125 having a minimal gap necessary for easily inserting the sealing portion 112 of the light source lamp 11 through it.

For molding the ellipsoidal reflector 212 having such step 212A, a molding die is so configured that a mold pressing portion which is projected for corresponding to the step 212A is formed on a mold surface of the reflecting surface 124 in order to mold a molten glass material with the use of the molding die.

After the ellipsoidal reflector 212 is molded with the end surface on the base end side of the insertion hole 123 being closed by a bottom portion 125A, the narrowest portion 125 is so formed that a hole is made by cutting and grinding the bottom portion 125A.

In the present embodiment, the ellipsoidal reflector 212 is configured without a reflection film formed on the lateral side 212A2 of the step 212A. In order not to form the reflection film on the lateral side 212A2, when the deposition material of the reflecting surface 124 is deposited on the reflecting portion 122, the deposition processing is conducted in the optical axis direction of the ellipsoidal reflector 212, so that the deposition material hardly reaches the lateral side 212A2 because of that the lateral side 212A2 is extending along the optical axis direction of the ellipsoidal reflector 212. Therefore, the part where the reflecting surface 124 is not deposited can be formed on the step 212A without masking or the like. Alternatively, the deposition processing can be conducted after entirely masking the step 212A by way of a masking tape or the like.

Following steps will be taken when the light source lamp 11 is fixed on the ellipsoidal reflector 212.

Firstly, the ellipsoidal reflector 212 is placed on a workbench or the like with the reflecting surface 124 facing upward, and the sealing portion 112 of the light source lamp 11 is then inserted to the insertion hole 123. At this time, in the state that the sub-reflection mirror 13 is attached to the light-emitting portion 111, the lead wire 113 is bent by approximately 180 degrees, inserted to the insertion hole 123, and extended to the outside from the base end of the insertion hole 123 in advance.

Next, the position of the light source lamp 11 is adjusted so that the light-emitting center of the light-emitting portion 111 is positioned at the first focal position L1 (see FIG. 5) of the reflecting surface 124. With the position adjustment of the light source lamp 11, the image of the electrodes of the light-emitting portion 111 is picked by a CCD camera or the like, the center of the electrodes is obtained, and the position adjustment is carried out so that the obtained center is superposed on the designed first focal position of the ellipsoidal reflector 212.

Figure 6B:
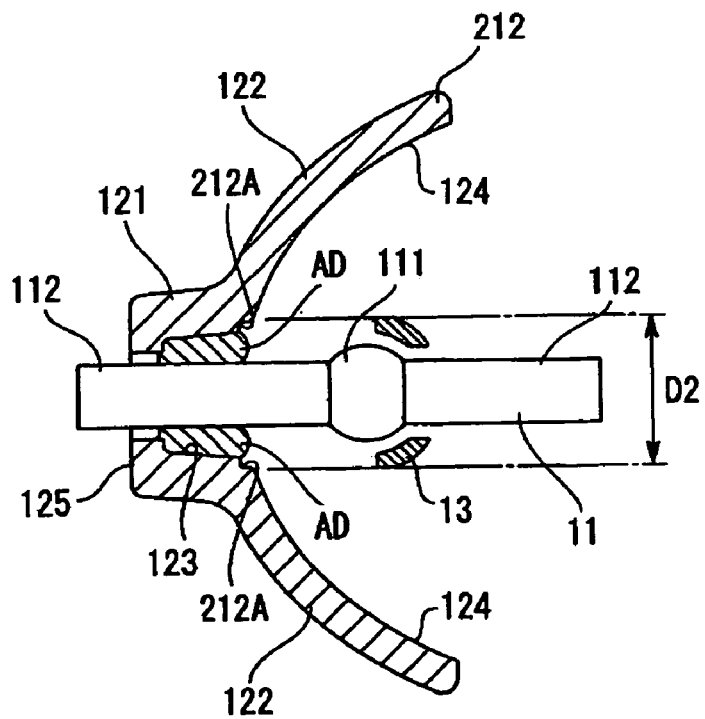

When the position of the light-emitting portion 111 is adjusted, an inorganic adhesive AD is injected inside the insertion hole 123 from the side of the reflecting surface 124 as shown in FIG. 6B. At this time, it is to be noted that the inorganic adhesive AD is injected with the use of a tapered jig such as a funnel, so that the inorganic adhesive will not be adhered on the reflecting surface 124.

When filling of the inorganic adhesive AD is completed, the ellipsoidal reflector 212 and the light source lamp 11 are held by a jig or the like, and the inorganic adhesive AD is then cured while the holding state is maintained.

According to the first embodiment, following advantages can be obtained.

(1) Since the step 212A having the lateral side 212A2 where the reflecting surface 124 is not deposited separates the deposition part of the reflecting surface 124 and the insertion hole 123, when the adhesive AD is injected to the insertion hole 123, the adhesive can be prevented from contacting the deposition part of the reflecting surface 124, thus preventing the reflecting surface 124 from being damaged.

(2) Since the lateral side 212A2 of the step 212A substantially parallel to the inner surface of the insertion hole 123 is adjacent to the reflecting surface 124, when assuming that the deposition processing direction of the reflecting surface 124 is the optical axis direction of the ellipsoidal reflector 212, the lateral side 212A2 of the step 212A becomes a surface substantially in parallel to the deposition direction. Accordingly, the lateral side 212A2 of the step 212A can be prevented from being deposited at the deposition processing of the reflecting surface 124, thus separating the adhesive AD filled to the insertion hole 123 and the reflecting surface 124 for further preventing the reflecting surface 124 from being damaged.

(3) Since the step 212A is formed, when the inorganic adhesive AD is injected, the inorganic adhesive AD can be retained at the step 212A even though the inorganic adhesive AD overflows from the insertion hole 123, thus preventing the reflecting surface 124 of the ellipsoidal reflector 212 from being adhered by the inorganic adhesive AD.

(4) Since the external diameter of the step 212A is equal to or smaller than the internal diameter of the valid reflection area of the reflecting surface 124 of the ellipsoidal reflector 212, the reflectivity of the reflector 212 would not be affected.

Second Embodiment

A second embodiment of the present invention will be described below.

In the above-described first embodiment, the insertion hole 123 is formed in a conic cylinder with the step 212A formed on the outer side thereof.

Figure 7A:
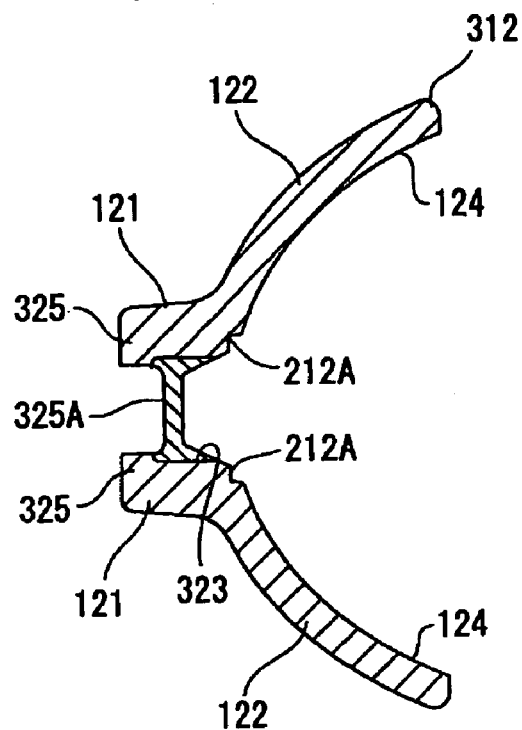
FIG. 7 is a cross sectional view showing the structure of an ellipsoidal reflector according to a second embodiment of the present invention.
Figure 7B:
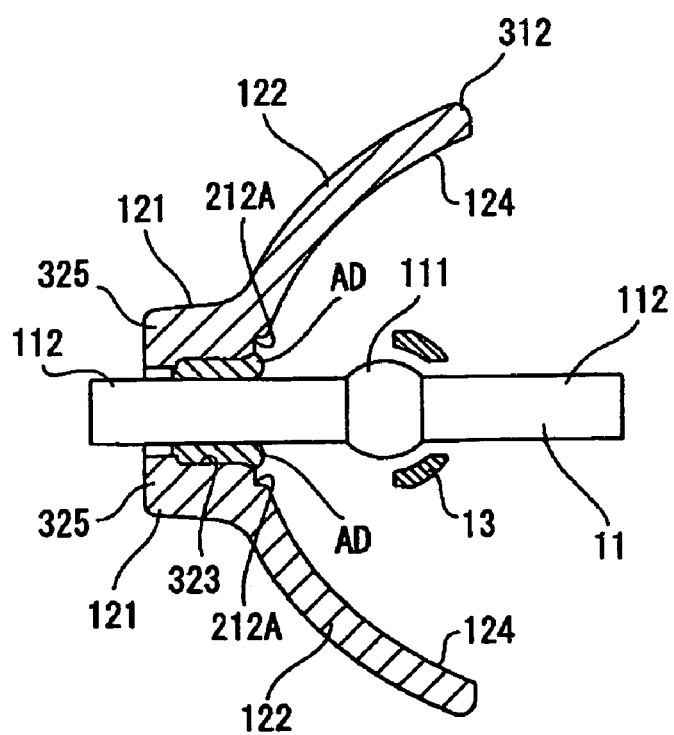

In contrast, as shown in FIGS. 7A and 7B, an ellipsoidal reflector 312 according to the second embodiment differs from the first embodiment in that an insertion hole 323 has an opening on the side of the reflecting surface 124, the opening part of the insertion hole 323 being constituted in a conic cylinder and a middle part thereof being constituted in a cylinder.

To form the insertion hole 323 of which the opening near the reflecting surface 124 is a conic cylinder and the middle part is a cylinder, the molding die has a projection provided on the mold surface for the base end side of the neck portion 121, and a conic projection provided on the mold surface for the reflecting surface 124 side thereof. The diameter of the bottom of the conic projection is larger than that of the projection of the mold surface for the base end side. By molding the molten glass material with the use of the mold surface, a recess can be formed on the end surface on the base end side of the neck portion 121. Then, the insertion hole 323 can be so formed that an opening is made by cutting and grinding the bottom portion 325A.

According to the ellipsoidal reflector 312 of the second embodiment, following advantages can be obtained in addition to the above-described advantages of the first embodiment.

(5) Since the opening of the insertion hole 323 near the reflecting surface 124 is a conic cylinder, the inorganic adhesive AD can easily be injected from the side of the reflecting surface 124. Additionally, since the middle part of the insertion hole 323 is a cylinder, the part parallel to the sealing portion 112 is lengthened, so that the sealing portion 112 of the light-emitting tube is unlikely pulled out from the ellipsoidal reflector 312.

Third Embodiment

A third embodiment of the present invention will be described below.

In the above-described second embodiment, the narrowest portion 325 is formed on the base end side of the neck portion 121.

Figure 8A:
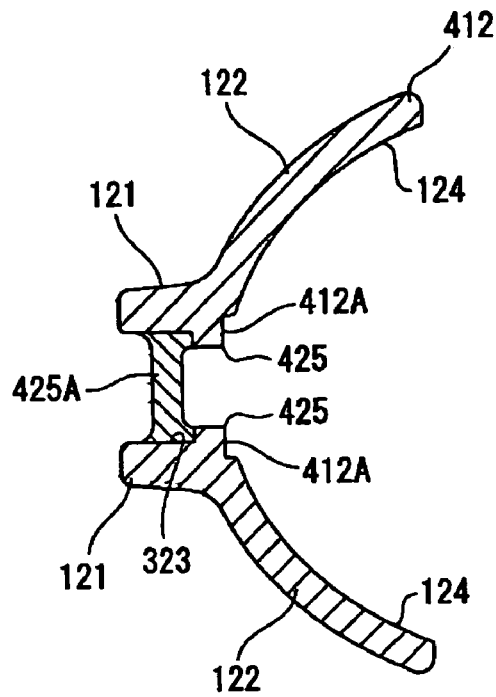
FIG. 8 is a cross sectional view showing the structure of an ellipsoidal reflector according to a third embodiment of the present invention.
Figure 8B:
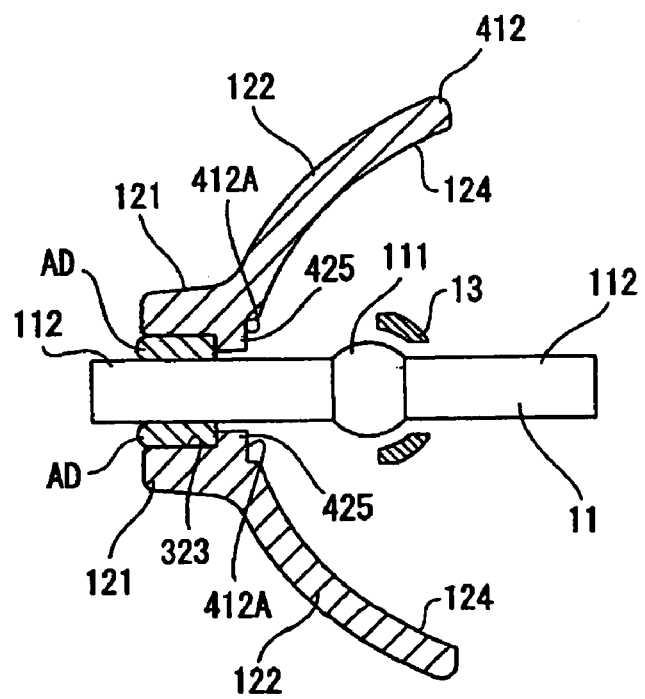

In contrast, as shown in FIGS. 8A and 8B, an ellipsoidal reflector 412 according to the third embodiment differs from the second embodiment in that a narrowest portion 425 of the ellipsoidal reflector 412 is formed near the reflecting surface 124, and a step 412A is provided between the narrowest portion 425 and the reflecting surface 124.

With this configuration that the narrowest portion 425 is formed near the reflecting surface 124, as shown in FIG. 8B, the inorganic adhesive AD is injected from the base end side of the neck portion 121 in the same manner as the conventional art.

To form the narrowest portion 425, the projections formed on the molding die for molding the ellipsoidal reflector 312 according to the second embodiment are switched, so that the projection with large diameter is formed on the mold surface for the reflecting surface 124. A bottom portion 425A is molded by the molten glass material with the use of the above mold surfaces, and the narrowest portion 425 is then formed by cutting and grinding the bottom portion 425A.

Incidentally, the lateral side of the step 412A adjacent to the reflecting surface 124 is considered as a part where the reflecting surface is not formed by the deposition material in the same manner as the first embodiment.

According to the ellipsoidal reflector 412 of the third embodiment, following advantages can be obtained in addition to the above-described advantage (5).

(6) Since the narrowest portion 425 is provided near the reflecting surface 124, the step 412A can be defined by the end surface of the narrowest portion 425 near the reflecting surface 124, the area of the step 412A can widely be secured, thus further strictly protecting the inorganic adhesive AD from overflowing to the reflecting surface 124.

(7) As a result of the step 412A widely securing the area thereof, the reflecting surface 124 can be avoided from contacting the adhesive AD inside the insertion hole 123 to prevent the reflecting surface 124 from being damaged.

Forth Embodiment

A fourth embodiment of the present invention will be described below.

In the above-described third embodiment, the insertion hole 323 formed on the ellipsoidal reflector 412 is a cylinder with a constant diameter.

Figure 9A:
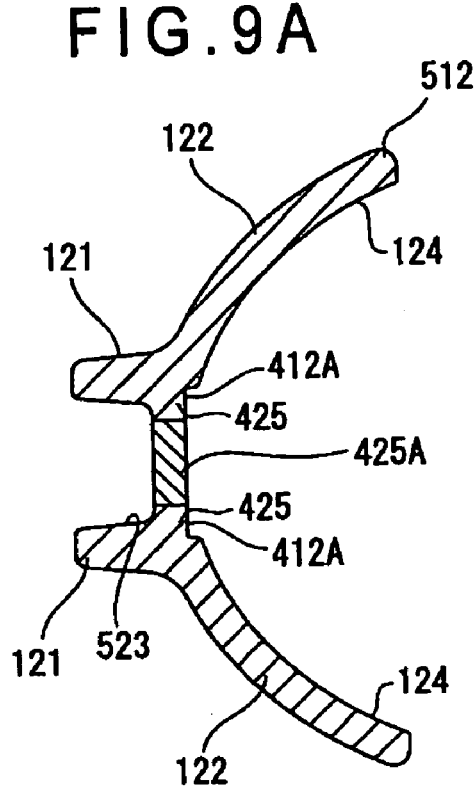
FIG. 9 is a cross sectional view showing the structure of an ellipsoidal reflector according to a fourth embodiment of the present invention.
Figure 9B:
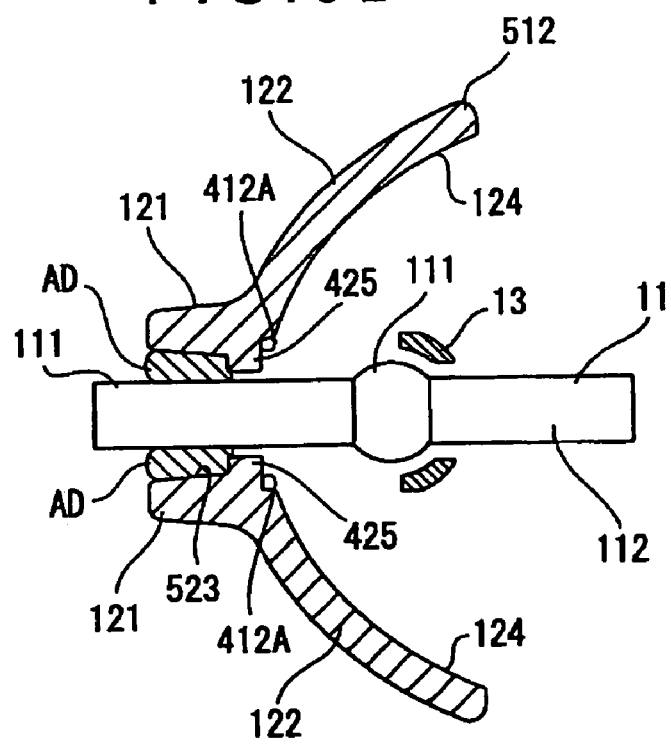

In contrast, as shown in FIGS. 9A and 9B, an ellipsoidal reflector 512 according to the fourth embodiment differs from the first embodiment in that an insertion hole 523 is a conic cylinder with its diameter decreasing from the base end side of the neck portion 121 toward the distal end side of the reflecting surface 124 in a manner reversed from the first embodiment.

To mold such ellipsoidal reflector 512, a projection correspondent to the step 412A is formed on the mold surface for the reflecting surface 124 while another projection is provided on the mold surface for the neck portion 121. The bottom portion 425A is molded by the molten glass material with the use of the above mold surfaces, and the narrowest portion 425 is then formed by cutting and grinding the bottom portion 425A.

According to the ellipsoidal reflector 512 of the fourth embodiment, following advantages can be obtained in addition to the above-described advantage (6).

(8) Since the insertion hole 523 is a conic cylinder with the diameter thereof increasing toward the base end side of the neck portion 121, the adhesive may easily be injected from the base end side of the neck portion 121.

Fifth Embodiment

A fifth embodiment of the present invention will be described below.

In the above-described forth embodiment, the end surface of the conic insertion hole 523 on the base end side of the neck portion 121 is unprocessed.

Figure 10A:
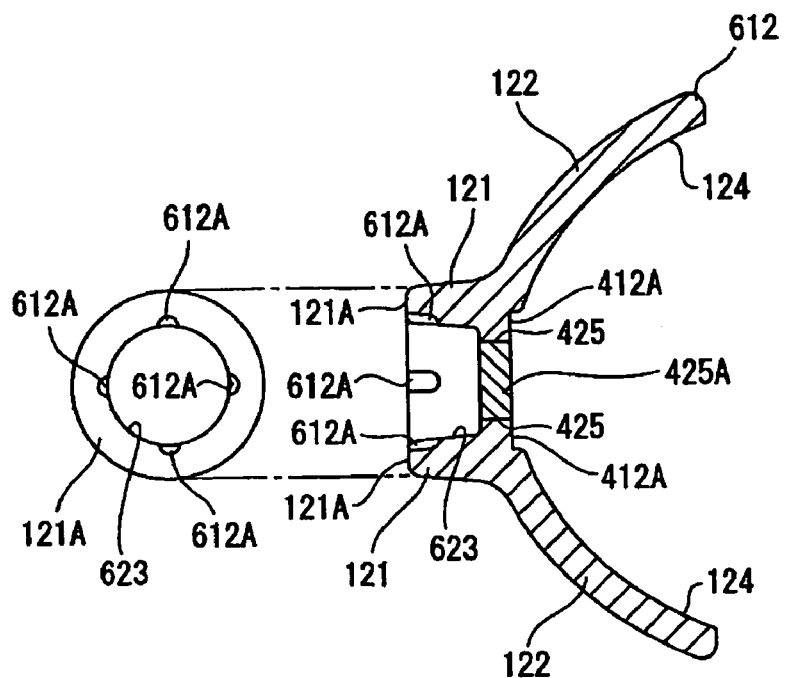
FIG. 10 is a cross sectional view showing the structure of an ellipsoidal reflector according to a fifth embodiment of the present invention.
Figure 10B:
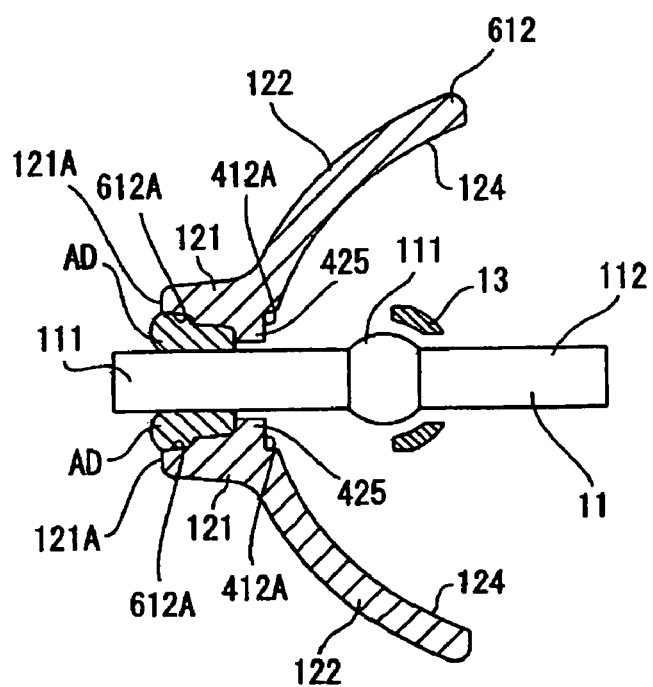

In contrast, as shown in FIGS. 10A and 10B, an ellipsoidal reflector 612 according to the fifth embodiment differs from the fourth embodiment in that a plurality of recesses 612A are formed on the insertion hole 623 on the base end side of the neck portion 121.

The recesses 612A are formed by cutting the part extending from the end surface 121A on the base end side of the neck portion 121 to the inner surface of an insertion hole 623. The recesses 612A may be formed at the same time as the ellipsoidal reflector 612 is molded, or may alternatively be formed after the ellipsoidal reflector 612 is molded by cutting and grinding.

For injecting the inorganic adhesive AD to the insertion hole 623, the inorganic adhesive AD is injected so as to be also filled inside the recesses 612A.

According to the ellipsoidal reflector 612 of the fifth embodiment, following advantages can be obtained in addition to the above-described advantages (7) and (8).

(9) With the recesses 612A formed on the base end side of the neck portion 121, the recesses 612A can be filled with the inorganic adhesive AD even though the inorganic adhesive AD is not completely adhered on the inner surface of the insertion hole 623 when the light source lamp 11 is fixed inside the insertion hole 623 with the inorganic adhesive AD filled therein. Accordingly, the inorganic adhesive AD mechanically fits to the recesses 612A, so that the position of the light-emitting portion 111 would not be deviated because of the light source lamp 11 rotating relative to the ellipsoidal reflector 612.

Sixth Embodiment

A sixth embodiment of the present invention will be described below.

In the above-described fifth embodiment, the recesses 612A extending from the inner surface of the insertion hole 623 toward the end surface 121A thereof on the base end side of the neck portion 121 prevent the light source lamp 11 from being rotated.

Figure 11A:
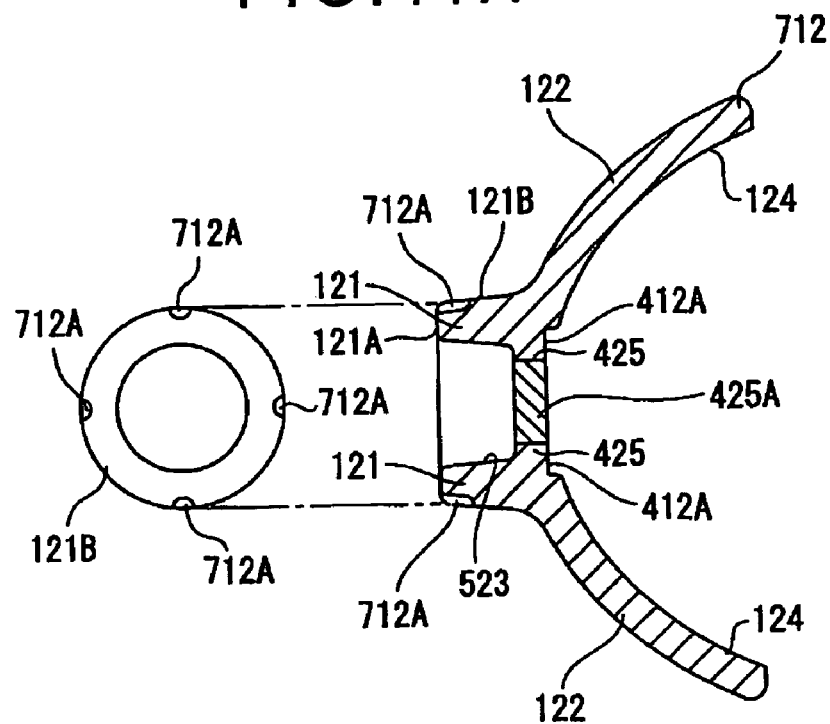
FIG. 11 is a cross sectional view showing the structure of an ellipsoidal reflector according to a sixth embodiment of the present invention.
Figure 11B:
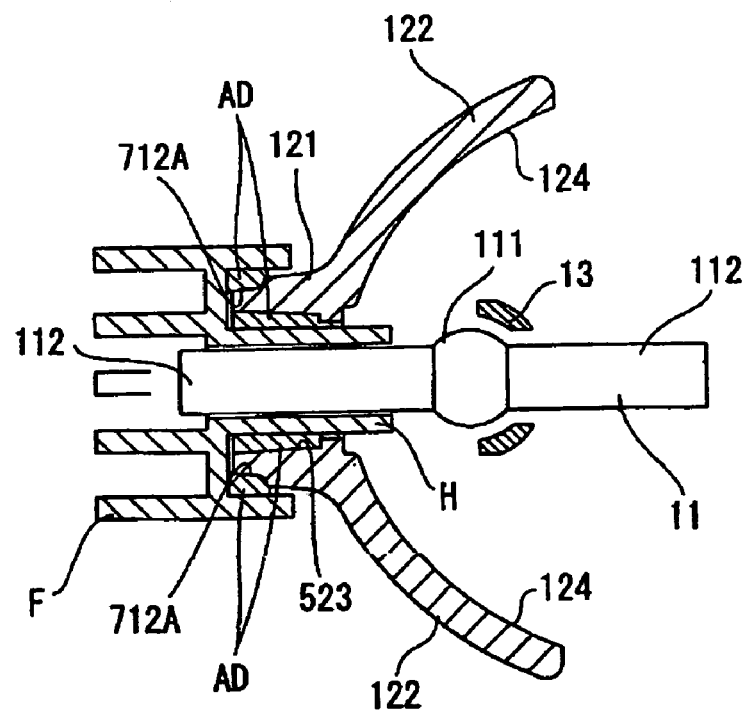

In contrast, as shown in FIGS. 11A and 11B, an ellipsoidal reflector 712 according to the sixth embodiment differs from the fifth embodiment in that a plurality of recesses 712A are formed on the peripheral surface 121B of the neck portion 121. That is, the profile of the inner surface of the insertion hole 523 is the same as that of the forth embodiment.

The recesses 712A may be formed at the same time as the ellipsoidal reflector 712 is molded, or may alternatively be formed after the ellipsoidal reflector 712 is molded by cutting and grinding in the same manner as the fifth embodiment.

When the light source lamp 11 is restricted to rotate by way of the ellipsoidal reflector 712 having the recesses 712A on the peripheral surface 121B of the neck portion 121, as shown in FIG. 11B, a cylindrical heat-conductive component H made of heat-conductive material is attached to the sealing portion 112 of the light source lamp 11 while a heat-radiation fin F is formed on the base end side, and then, the inorganic adhesive AD is injected inside the insertion hole 523 as well as between the heat-radiation fin F and the neck portion 121. When the heat-radiation fin F is fitted in, the inorganic adhesive AD is filled inside the recesses 712A, and consequently, the light source lamp 11 is restricted to rotate after the inorganic adhesive AD is cured.

Heat generated by the light-emitting portion 111 is conducted to the heat-radiation fin F formed on the base end side of the neck portion 121 by way of the cylindrical heat-conductive component H. The heat-radiation fin F is then cooled by the cooling air blown thereinto, so that the light-emitting portion 111 is efficiently cooled.

According to the ellipsoidal reflector 712 of the sixth embodiment, following advantages can be obtained in addition to the above-described advantages of the respective embodiments.

(10) Since the cooling mechanism by way of the cylindrical heat-conductive component H and the heat-radiation fin F can be provided on the light source lamp 11, and besides, the inorganic adhesive AD can be filled inside the recesses 712A by the inorganic adhesive AD being only filled between the heat-radiation fin F and the neck portion 121, the rotation of the light source lamp 11 can be restricted.

Seventh Embodiment

A seventh embodiment of the present invention will be described below.

In the above-described first embodiment, the insertion hole 123 of the ellipsoidal reflector 212 is configured as a conic cylinder with its diameter increasing toward the reflecting surface 124, the ellipsoidal reflector 212 having the neck portion 121 and the narrowest portion 125.

Figure 12A:
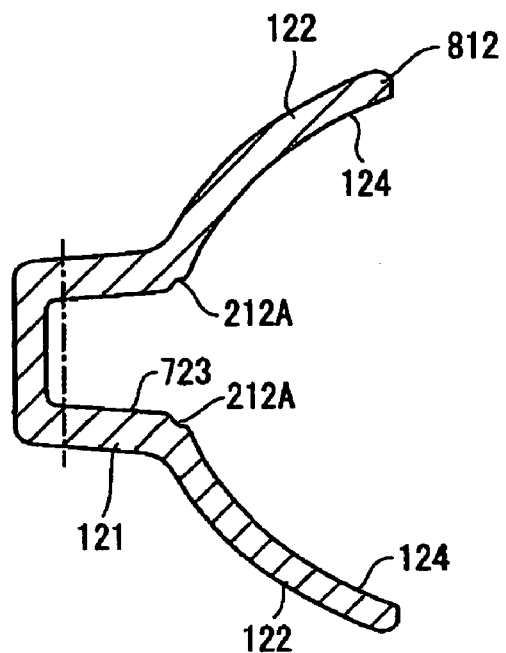
FIG. 12 is a cross sectional view showing the structure of an ellipsoidal reflector according to a seventh embodiment of the present invention.
Figure 12B:
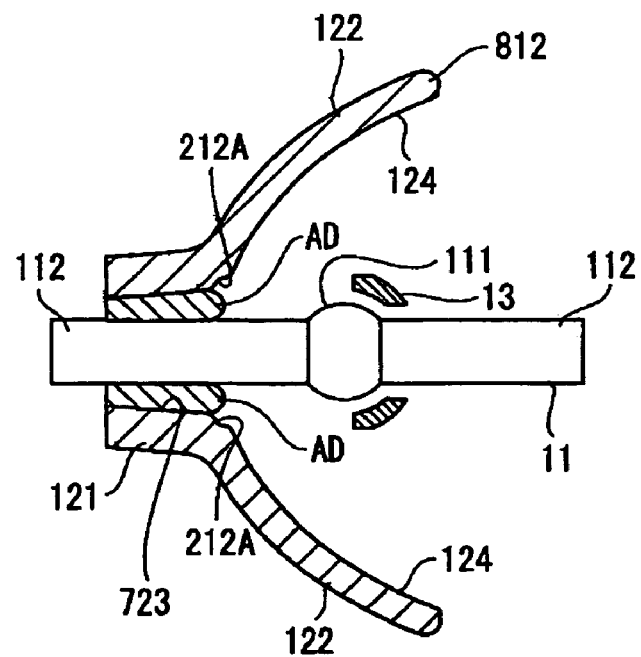

In contrast, as shown in FIGS. 12A and 12B, an ellipsoidal reflector 812 according to the seventh embodiment differs from the first embodiment in that a part of the neck portion 121 is cut off in direction orthogonal to the optical axis so as to be open at the base end side. Besides, the neck portion 121 does not include the narrowest portion 125 as shown in FIGS. 6A and 6B of the first embodiment.

As shown in FIG. 12A, to form the neck portion 121, the ellipsoidal reflector 812 is molded with the end surface of the insertion hole 723 at the base end thereof being closed, and the closed part is then cut off by a tool such as a diamond wheel so that a part of the neck portion 121 is remained.

The end surface of the neck portion 121 on the base end side thereof can positively generate chippings by intentionally selecting the type of the diamond wheel.

When the inorganic adhesive AD is filled to the insertion hole 723, the inorganic adhesive AD is overflowed and filled to the chippings generated on the end surface of the neck portion 121 on the base end side thereof.

Meanwhile, the surface of the insertion hole 723 is mirror finished because the surface of the insertion hole 723 is a molded surface made by molding with the molten glass material. Similarly, the surface of the sealing portion 112 is also mirror finished.

In the case that the sub-reflection mirror covering the front half of the light-emitting portion of the light-emitting tube is provided at the light source device, the sub-reflection mirror 13 has an adhering surface on the inner periphery thereof opposite to the outer periphery of the sealing portion of the light-emitting tube, so that the sub-reflection mirror 13 is fixed by applying the adhesive between the outer periphery of the sealing portion 112 and the above adhering surface.

Additionally, the neck portion 121 is provided with an opening on the base end side by cutting off the part of the neck portion 121, the adhesion between the sub-reflection mirror 13 and the sealing portion 112 on the distal end side in the light-irradiation direction can be conducted in the same direction as the adhesion between the neck portion 121 and the sealing portion 112 on the base end side in the light-irradiation direction.

According to the ellipsoidal reflector 812 of the seventh embodiment, following advantages can be obtained in addition to the above-described advantages of the first embodiment.

(11) Since the inorganic adhesive AD is filled to be overflowed to the chippings generated on the end surface of the cut neck portion 121 on the base end side thereof, the amount of the adhesive to be retained is increased so that the reflector and the light source lamp can be fixed tightly due to increase of the adhesive strength. Further, since the chippings are generated on the end surface on the base end side, a groove for holding the adhesive is not necessary to be provided, thus eliminating the cost for such a groove.

(12) Since the surface of the insertion hole 723 is mirror finished as is the surface of the sealing portion 112, the adhesive state, such as the flow state for example, of the adhesive is improved when both mirror finished surfaces are adhered, thus further enhancing the adhesive intensity between the reflector and the light source lamp for tight bonding and fixing.

(13) Since the adhesion between the sub-reflection mirror 13 and the sealing portion 112 on the distal end side thereof in the light-irradiation direction can be conducted from the same direction as the adhesion between the neck portion 121 and the sealing portion 112 on the base end side thereof in the light-irradiation direction, adhering efficiency can be enhanced as is its workability.

Eighth Embodiment

An eighth embodiment of the present invention will be described below.

As shown in FIGS. 12A and 12B, in the ellipsoidal reflector 812 according to the seventh embodiment, the part of the neck portion 121 is cut off in direction orthogonal to the optical axis so as to be open at the base end side.

Figure 13A:
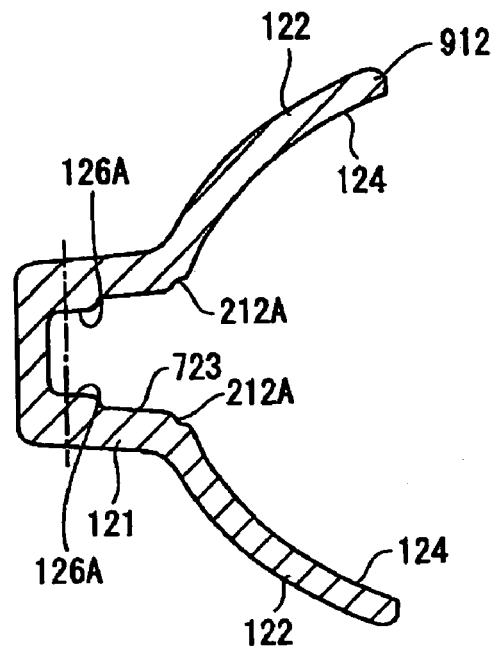
FIG. 13 is a cross sectional view showing the structure of an ellipsoidal reflector according to an eighth embodiment of the present invention.
Figure 13B:
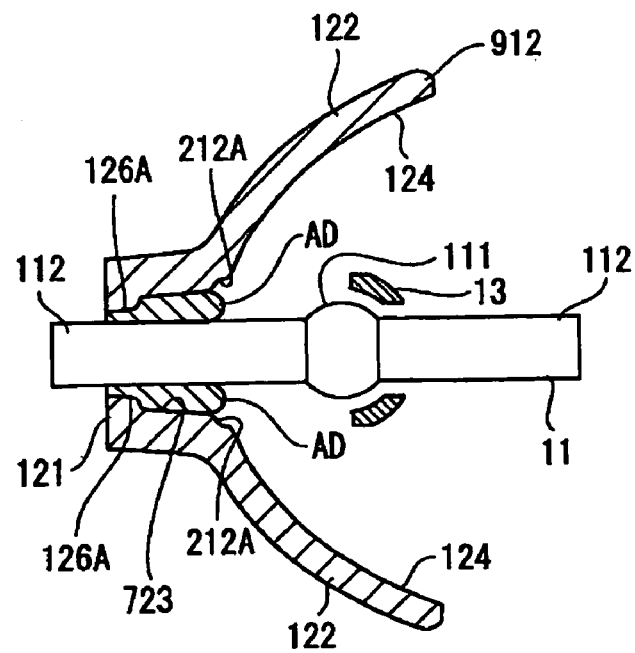

In contrast, as shown in FIGS. 13A and 13B, an ellipsoidal reflector 912 according to the eighth embodiment differs from the seventh embodiment in that a step 126A is provided on an insertion hole 723, the step 126A being a tapered cylinder depressed by one step, although it is similar to the seventh embodiment that a part of the neck portion 121 is cut off.

As shown in FIG. 13A, to form the step 126A, the ellipsoidal reflector 912 is molded with the end surface of the insertion hole 723 on the base end side thereof being closed, and a part of the neck portion 121 is then cut off. Accordingly, a part where the adhesive is retained is circularly provided at the step between the insertion hole 723 and the step 126A.

According to the ellipsoidal reflector 912 of the eighth embodiment, following advantages can be obtained in addition to the above-described advantages (11) to (13) of the seventh embodiment.

(14) Since the tapered cylindrical step 126A is provided on the inner surface of the insertion hole 723, the inorganic adhesive AD is easily retained at the circular step between the insertion hole 723 and the step 126A even when the inorganic adhesive AD is injected from the side of the reflecting surface 124, thus securely preventing the inorganic adhesive AD from overflowing from the opening of the insertion hole 723 at the end surface on the base end side.

Ninth Embodiment

A ninth embodiment of the present invention will be described below.

As shown in FIGS. 12A and 12B, in the ellipsoidal reflector 812 according to the seventh embodiment, the part of the neck portion 121 is cut off in direction orthogonal to the optical axis so as to be open at the base end side.

Figure 14A:
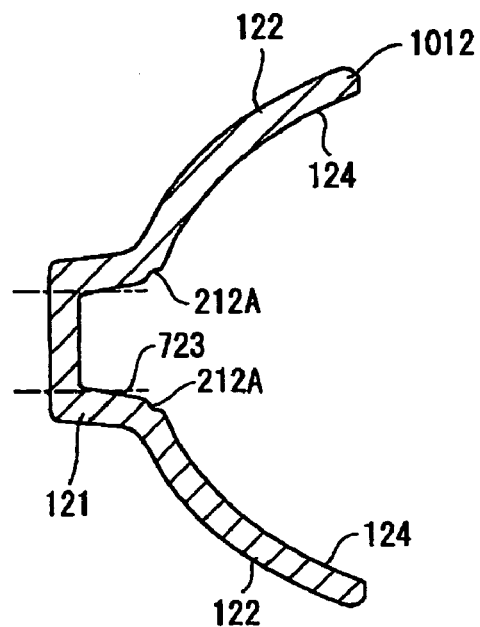
FIG. 14 is a cross sectional view showing the structure of an ellipsoidal reflector according to a ninth embodiment of the present invention.
Figure 14B:
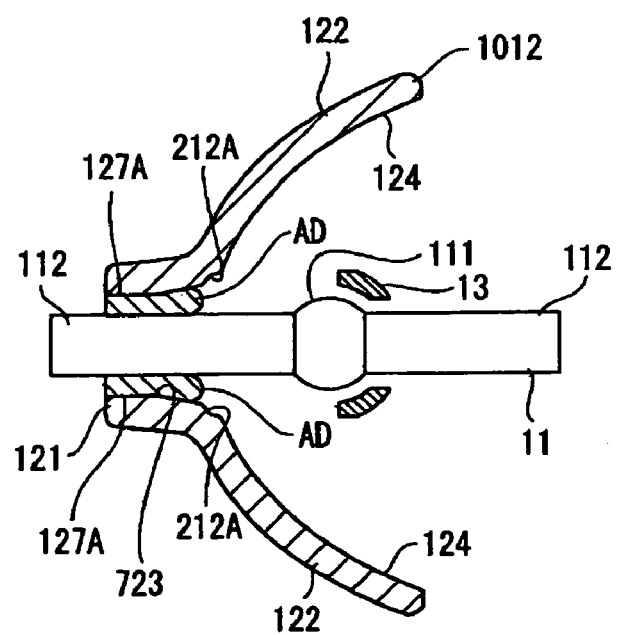

In contrast, as shown in FIGS. 14A and 14B, an ellipsoidal reflector 1012 according to the ninth embodiment differs from the seventh embodiment in the profile of the base end side of the neck portion 121, in which a cylindrical portion 127A is provided at a part of the insertion hole 723, although it is similar to the seventh embodiment that a part on the base end side of the neck portion 121 is open.

As shown in FIG. 14A, to form the cylindrical portion 127A, the ellipsoidal reflector 1012 is molded with the end surface of the insertion hole 723 at the base end side thereof being closed, and the base end side of the neck portion 121 is then processed by hole drilling. The cylindrical portion 127A is so formed that the insertion hole 723 is processed by cutting and grinding with the use of a tool such as a diamond wheel, the cylindrical portion 127A being provided at the part of the insertion hole 723.

Further, chippings may be generated on the end surface of the neck portion 121 on the base end side thereof. As described above, the chippings can positively be generated by intentionally selecting the type of the diamond wheel.

According to the ellipsoidal reflector 1012 of the ninth embodiment, following advantages can be obtained in addition to the above-described advantages (11) to (13) of the seventh embodiment.

(15) Since the cylindrical portion 127A is provided at the part of the insertion hole 723, the filling amount of the adhesive is increased when the inorganic adhesive AD is filled between the insertion hole 723 and the sealing portion 112 for adhering. This causes the further tight fixing.

Modifications of Embodiment

Incidentally, the scope of the present invention is not restricted to the above-described embodiment, but includes following modifications.

While the light source lamp unit 10 is used for the projector 1 having the liquid crystal panels 42R, 42G and 42B in the first embodiment, it is not limited thereto. For example, the present invention can be applied to a projector equipped with a device using a micro-mirror. Additionally, the present invention can be applied to an optical equipment other than the projector.

Further, while the above seventh to the ninth embodiments (refer to FIGS. 12, 13 and 14) utilizes the chippings generated on the end surface of the neck portion 121 on the base end side thereof, the present invention is not limited thereto, and may utilize a reflector structure without chippings.

In other words, chippings are not necessary as long as the adhesive intensity between the reflector and the light source lamp is guaranteed.

Furthermore, the cross section of the insertion hole of the reflector is not limited to that described in the respective embodiments, but may be others as long as a step is available to be formed.

Specific configuration and arrangement in implementing the present invention may be designed in any manner as long as an object of the present invention can be achieved.

What is claimed is:

1. A light source device, comprising:
   a light-emitting tube including a light-emitting portion that generates a light beam by an electric discharge between electrodes, and sealing portions provided on both sides of the light-emitting portion; and
   a reflector including a neck portion provided with an insertion hole to which the light-emitting tube is inserted, and a reflecting portion integrally formed with the neck portion and having an ellipsoidal curved reflecting surface that irradiates the light beam emitted by the light-emitting portion and aligns the light beam in a predetermined direction,
   wherein the light-emitting tube has a sub-reflection mirror that covers substantially front half of the light-emitting portion,
   wherein the reflector has a step formed between the peripheral edge of an opening end of the insertion hole near the reflecting surface and the reflecting surface,
   wherein the external diameter of the step is larger than the external diameter of the sub-reflection mirror while the external diameter of the step is within internal the diameter of a valid reflection area of the reflector, the internal diameter being defined by a focal position on the front side of the reflector and the outer periphery of the sub-reflection mirror, and wherein the step has a part where the reflecting surface is not deposited on the border with the valid reflection area.

2. The light source device according to claim 1, wherein the step is formed as a recess by cutting the part between the reflecting surface and the inner periphery of the insertion hole to have an L-shaped cross-section, and wherein a lateral side of the step adjacent to the reflecting surface is the part where the reflecting surface is not deposited.

3. A projector comprising:

a light source device;

an optical modulator that modulates a light beam irradiated by the light source device in accordance with image information to form an optical image; and a projection optical device that projects the optical image formed by the optical modulator in an enlarged manner, wherein the light source device comprises:

a light-emitting tube including a light-emitting portion that generates a light beam by an electric discharge between electrodes, and sealing portions provided on both sides of the light-emitting portion; and a reflector including a neck portion provided with an insertion hole to which the light-emitting tube is inserted, and a reflecting portion integrally formed with the neck portion and having an ellipsoidal curved reflecting surface that irradiates the light beam emitted by the light-emitting portion and aligns the light beam in a predetermined direction, wherein the light-emitting tube has a sub-reflection mirror that covers substantially front half of the light-emitting portion, wherein the reflector has a step formed between the peripheral edge of an opening end of the insertion hole near the reflecting surface and the reflecting surface, wherein the external diameter of the step is larger than the external diameter of the sub-reflection mirror while the external diameter of the step is within the internal diameter of a valid reflection area of the reflector, the internal diameter being defined by a focal position on the front side of the reflector and the outer periphery of the sub-reflection mirror, and wherein the step has a part where the reflecting surface is not deposited on the border with the valid reflection area.

4. The projector according to claim 3, wherein the step is formed as a recess by cutting the part between the reflecting surface and the inner periphery of the insertion hole to have an L-shaped cross-section, and wherein a lateral side of the step adjacent to the reflecting surface is the part where the reflecting surface is not deposited.

* * * * *